(12) United States Patent
Kamitani et al.

(10) Patent No.: US 7,124,280 B2
(45) Date of Patent: Oct. 17, 2006

(54) EXECUTION CONTROL APPARATUS OF DATA DRIVEN INFORMATION PROCESSOR FOR INSTRUCTION INPUTS

(75) Inventors: Shingo Kamitani, Tenri (JP); Kouichi Hatakeyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 588 days.

(21) Appl. No.: 09/833,653

(22) Filed: Apr. 13, 2001

(65) Prior Publication Data

US 2002/0040426 A1    Apr. 4, 2002

(30) Foreign Application Priority Data

Apr. 13, 2000  (JP) ............... 2000-112467

(51) Int. Cl.
G06F 15/82    (2006.01)
G06F 9/30     (2006.01)

(52) U.S. Cl. ..................... 712/26; 712/248
(58) Field of Classification Search .......... 712/201, 712/25, 18, 26, 27, 221, 248
See application file for complete search history.

(56) References Cited

U.S. PATENT DOCUMENTS

| | | | |
|---|---|---|---|
| 4,594,653 A * | 6/1986 | Iwashita et al. | 712/27 |
| 5,369,774 A | 11/1994 | Hatakeyama | 712/25 |
| 5,483,657 A | 1/1996 | Hatakeyama | 712/27 |
| 5,542,079 A | 7/1996 | Hatakeyama | 712/26 |
| 5,640,525 A | 6/1997 | Yumoto et al. | 712/201 |
| 6,038,656 A * | 3/2000 | Martin et al. | 712/211 |
| 6,530,011 B1 * | 3/2003 | Choquette | 712/3 |

OTHER PUBLICATIONS

High Performance Single Chip Dataflow Processor; Kuru, G; ASIC Conference and Exhibit, 1995; Sep. 18-22, 1995; pp. 346-349.*
An Advanced Dataflow Processor Architecture Based on a Multiple Input Node Concept; Kuru, G and Deshmukh, R G; Southeastcon '93; Apr. 4-7, 1993; 8 pages.*
COmputer Architecture, A Quantitative Approach; David A Patterson and John L Hennessy; 1990; Morgan Kaufmann Publishers; pp. 429-431.*

* cited by examiner

Primary Examiner—Daniel H. Pan
(74) Attorney, Agent, or Firm—Birch, Stewart, Kolasch and Birch, LLP.

(57) ABSTRACT

An execution control apparatus of a data driven information processor includes: an instruction decoder that outputs the a number of inputs of an instruction; a waiting data storage region that stores N (N≧2) waiting data and respective data valid flags in one address; a constant storage that stores constants and a constant valid flag; a constant readout unit that reads out a constant and a constant valid flag from the constant storage with the node number of an input packet as the address; a unit that calculates a hash address and selects a process for data waiting depending upon a combination of a data valid flag, a constant valid flag, and the number of instuction inputs; and a unit that performs a waiting process in response to a select signal.

18 Claims, 7 Drawing Sheets

VCD : Validity of Constant Data
(RELEVANT CONSTANT DATA IS VALID WHEN "1")

PRE : PREsence flag
(RELEVANT WAITING DATA IS VALID WHEN "1")

2-INPUT INSTRUCTION

COMBINATION OF
2-INPUT INSTRUCTION

EXECUTION CONTROL APPARATUS OF DATA DRIVEN INFORMATION PROCESSOR FOR INSTRUCTION INPUTS

BACKGROUND OF THE INVENTION

1. Field of the Invention

The present invention relates to an execution control apparatus of a data driven information processor. Particularly, it relates to an execution control apparatus of a data driven information processor that can easily increase the performance and efficiency, improve operation flexibility and cost effectiveness by devising the packet waiting process mechanism and packet structure in the operation of image processing and motion picture processing.

2. Description of the Background Art

The data driven principle is considered to be an inherently natural information processing scheme. A data driven information processor is structured upon the basis of the data driven principle. The data driven processor is generally refers to a set of information processors developed from the research project for an effective mechanism that executes a target program directly converted from an executable description of high level specification.

The data driven principle will be discussed below. A program includes a plurality of instructions. Each instruction will be ready to execute when all the argument data required for its execution are present in a token (data packet) format. The instruction ready to execute is sent to the operation processing mechanism together with the argument data and the destination of the executed result.

The device that determines whether an instruction has become ready to execute and transmits the executable instruction, if any, together with the argument data and the address of the executed result to the operation processing mechanism is called a "firing control mechanism".

At the operation processing mechanism, the instruction is executed. The executed result is transferred to the destination in the form of a token as the argument data of the next instruction to be executed.

FIG. 1 shows a structure of a system employing a general data driven information processor in image processing. Referring to FIG. 1, this system includes a data driven processor 1 having input ports IA and IB connected to data transfer paths 4 and 5, respectively, output ports OA and OB connected to data transfer paths 6 and 7, respectively, and an output port OV and an input port IV connected to data transfer paths 8 and 9, respectively, a memory interface 2 connected to data driven processor 1 through data transfer paths 8 and 9, and an image memory 3 interconnected with memory interface 2 through a memory access control line 1A.

Data driven processor 1 receives in time series through data transfer path 4 or 5 an input data packet having an identifier referred to as "generation number" assigned according to the input time sequence. Preset processing contents are stored in data driven processor 1. In response to the input of an input data packet, data driven processor 1 implements a process according to the processing contents stored therein. When access to image memory 3 is to be effected during processing, data driven processor 1 sends out on data transfer path 8 via output port OV an access request (reference/update and the like of the contents in image memory 3). Upon receiving this access request, memory interface 2 accesses image memory 3 via memory access control line 1A. The result is returned to data driven processor 1 via data transfer path 9 and input port IV.

Upon completion of the process by data driven processor 1 with respect to the input data packet, data driven processor 1 sends out via output port OA or OB an output data packet to data transfer path 6 or 7.

FIG. 2 shows the basic structure of a data driven information processor. FIG. 3 shows the basic structure of the input/output packet of a data driven information processor.

Referring to FIG. 2, data driven processor 1 includes a merging unit 10 that combines an externally applied input data packet and a data packet flowing in data driven processor 1. Data driven processor 1 further includes a firing control unit 11 that receives a data packet from merging unit 10, determines whether all the data required for instruction execution are available or not, and outputs a data packet including all the data. Data driven processor 1 further includes a functional unit 12 that performs an operation determined by the operation code on the data in the data packet from firing control unit 11, reassembles and outputs the result as a data packet including the node number of the next instruction. Data driven processor 1 additionally includes a program storage unit 13 where instructions are prestored, for receiving a data packet from functional unit 12, reading out the code of the instruction to be executed next and the next node number, assembling a data packet with the node number included in the relevant data packet as the destination, and output the data packet. Finally, data driven processor 1 includes a branch unit 14 for receiving a data packet from program storage unit 13 and sending the data packet outside or towards merging unit 10 according to the destination.

The data packet shown in FIG. 3 is applied to merging unit 10. This data packet is further sent to firing control unit 11. As shown in FIG. 2, firing control unit 11 includes a waiting storage region and a constant storage region, as disclosed in U.S. Pat. No. 5,640,525. The data packet applied to firing control unit 11 is stored in a waiting storage region 11a of firing control unit 11 until the counterpart data packet to form a pair to be processed arrives. When the data packet pair is available, a data packet including the operation code and the companion data is reassembled and is sent to functional unit 12. When the counterpart to be processed is not a data packet but constant data, the waiting at firing control unit 11 is not effected. In such a case, a data packet is reassembled by obtaining constant data from constant storage region 11b.

Functional unit 12 processes the data in the received packet in accordance with the operation code in the packet. The resultant data packet is reassembled and is output.

Program storage unit 13 receives the data packet from functional unit 12, accesses its program memory at an address determined by the node number included in the received data packet, retrieves the operation code to be executed next as well as the next node number, reassembles a data packet, and output it. The data packet output from program storage unit 13 is selectively sent outside data driven processor 1 or to merging unit 10 by branch unit 14 according to the included node number.

Referring to FIG. 3, the data packet applied to data driven processor 1 includes a PE number 15 (PE stands for "processing element".), a node number 16, a generation number 17, and data 18.

PE number 15 is an identifier that distinguishes data driven information processors structured as shown in FIG. 12 from each other in a system where a plurality of the data driven information processors are interconnected via a plurality of input/output control units (merging unit 10 and branch unit 14).

Node number 16 is used as an address to retrieve an operation code stored in program storage unit 13 of FIG. 2.

Generation number 17 is an identifier of a data packet input in a time series, and is also used as the address of image memory 3. Generation number 17, as an address in image memory 3, includes a field number FD, a line number LN, and a pixel number PX, as shown in FIG. 3. The relationship among the image, field number FD, line number LN and pixel number PX is as shown in FIG. 4.

The structure of the data packet applied to firing control unit 11 of FIG. 2 is shown in FIG. 5.

Referring to FIG. 5, this data packet has a structure similar to that of the data packet (FIG. 3) input to merging unit 10, and includes an operation code 19, a node number 20, a generation number 21, and data 22. It is to be noted that an operation code 19 is provided instead of PE number 15 of FIG. 3.

FIG. 6 shows the format of data stored in constant storage region 11b of firing control unit 11. Constant storage region 11b stores constant data to be used when the data companion to a data packet is a constant. Referring to FIG. 6, each record includes a VCD 23 (VCD is a flag indicating whether the constant data is valid (1) or invalid (0)), and constant data 24.

Referring to FIG. 7, waiting storage region 11a includes a hash overflow address 25 that stores the portion of the waiting data packet not used in calculating the hash address, a PRE 26 which is a flag indicating the presence of waiting data, i.e. indicating that a data packet is waiting ("1" when valid and "0" when invalid), and waiting data 27. Hash overflow address 25 stores the portion of node number 16 and a part of generation number 17 that is not used in calculating the hash address of the waiting data packet.

The format of the data packet output from program storage unit 13 is as shown in FIG. 5. When this data packet circulates through branch unit 14 and merging unit 10 to enter firing control unit 11, the constant data and VCD are obtained from constant storage region 11b of FIG. 6. Then, determination is made as to which of storing/firing/passing is to be selected as the operation for waiting storage region 11a of FIG. 7. This determination is based on the combination of operation code 16, the VCD obtained from constant storage region 11b and PRE 26 in waiting storage region 11a.

First, the operation code in the data packet is decoded to determine whether the instruction to be executed by functional unit 12 is a 1-input instruction or a 2-input instruction. In the case of a 1-input instruction, that data packet will be "passed". If the instruction is a 2-input instruction and VCD=1, the data packet is likewise "passed" since a counterpart data packet is not required as the data pair.

In other cases, i.e., in the case of a 2-input instruction and VCD=0, waiting for a paired data packet is required. Therefore, access to waiting storage region 11a is effected. Here, the hash address is calculated. If the PRE of the relevant address is "0", the paired data packet has not yet arrived. Therefore, the process with respect to this data packet is "storing". The data and the hash overflow address are stored in the relevant region, and PRE is updated to 1. PRE=1 of the relevant address implies that the paired data packet is present in waiting storage region 11a. Therefore, the data required for operation together with the input data packet are now available. Thus, the process is "fired". The waiting data is output from waiting storage region 11a. The packet is reconfigured, and PRE is updated to 0. The reconfigured data packet has the structure shown in FIG. 8.

Referring to FIG. 8, this data packet includes a VCD 28, an operation code 29, a node number 30, a generation number 31, left data 32, and right data 33. Left and right data 32 and 33 are the data required for the operation of a 2-input instruction, and are obtained from the waiting data packet and the input data packet. This data packet is sent to functional unit 12.

By repeating the above-described process sequentially, data is processed while a data packet circulates through the data driven information processor.

In order to maintain throughput of the access to waiting storage region 11a, firing control unit 11 may be interleaved as disclosed in U.S. Pat. No. 5,640,525. More specifically, waiting storage region 11a includes a block 34 and two regions (memory 35 and memory 36), as shown in FIG. 9. Access is selectively distributed to either memory by the sorting of the data packet through block 34. Specification of which region is to be accessed is set by a bit called "interleave bit (IB)" in a register provided in block 34. IB is set by loading a parameter called "FIS parameter" (3 bits) to the aforementioned register in block 34.

The relationship between FIS and IB is summarized in the following Table 1. The FIS parameter also serves to specify the type of the hash function in calculating the hash address.

TABLE 1

| FIS | 000 | 001 | 010 | 011 | 100 | 101 | 110 | 111 |
|-----|-----|-----|-----|-----|-----|-----|-----|-----|
| IB  | G1  | G2  | G3  | G4  | N0  | N1  | N2  | N3  |

Gn: n-th bit of the Generation Number
Nn: n-th bit of the Node Number

It is to be noted that the generation number includes 5 bits, i.e., G0–G4. Therefore, G1, for example, represents the second least significant bit of the generation number.

As mentioned before, the waiting storage is realized by an interleave structure in the conventional art shown in FIG. 9. Margin in capacitance must be provided for each memory. As a result, the memory cost is increased. Furthermore, there is a possibility of the access being concentrated to one of memories 35 and 36 depending upon the sequence of the data packets arriving in a stream. The intended throughput cannot be maintained sufficiently in such cases.

For example, it is assumed that FIS='000' in Table 1. Here, IB is determined by the first bit of generation number 31. Assuming that data packets whose generation numbers are 0(0b0 . . . 000000), 4(0b0 . . . 000100), 8(0b0 . . . 001000), 12(0b0 . . . 001100), . . . sequentially arrive at firing control unit 11, IB=0 is constantly established. As a result, access is concentrated to memory 35, so that sufficient throughput cannot be achieved.

Furthermore, the data packet in the data driven information processor is transferred in a pipelined manner by transfer between latches that are sequentially coupled by means of a self-timed transfer control circuit (C element). Reading the PRE takes one clock cycle necessary for the transfer between C elements. Another clock cycle is required for update value detection and update. An execution control apparatus of a data driven information processor that can avoid such throughput degradation depending upon the arriving order of data packets is desired.

The demands placed on the processing performance in image processing and video processing are ever increasing. The data driven information processor has architecture suitable for such image processing and video processing. Therefore, an execution control apparatus of a data driven information processor is desired that can process data more speedily than other architecture and with higher throughput, and that allows flexible programming.

Since the demanded operations are becoming more complicated, highly complex instructions will be necessary. However, only a 2-input instruction at most is implemented in prior art. There is a case where one wishes to obtain the resultant output from three or more equal inputs. Since one node can perform only a 2-input process as shown in FIG. 10(A) in the conventional data driven information processor, the only possible approach to realize a 3-input instruction is to combine nodes 38 and 39 as shown in FIG. 10(B) through programming. The response time is additionally required in comparison to the case where one node can perform a 3-input process. Accordingly, execution becomes inefficient.

Particularly in the structure shown in FIG. 10(B), it is to be noted that the operation between inputs A and B is carried out at node 38, and then the operation of node 39 is carried out between the resultant output X and an input C. This means that input C must be in waiting storage region 11a until the process of node 38 is completed and X arrives at firing control unit 11. As a result, waiting storage region 11a will be used inefficiently. It is desired to effectively utilize the waiting storage region and improve the processing efficiency by carrying out the process of three or more inputs with one node.

As the instructions become more complex, not only scalar data but also vector data will be more frequently processed. Correspondingly, the need will arise to handle the constants stored in constant storage region 11b as vector data. In this case, in order to allow a complex instruction to be handled more flexibly, it is preferable to selectively use the constants, not fixed to one type of either scalar or vector, but switched therebetween for the same instruction.

SUMMARY OF THE INVENTION

An object of the present invention is to provide an execution control apparatus and method of a data driven information processor that does not have the execution efficiency affected by the arriving order of data packets.

Another object of the present invention is to provide an execution control apparatus and execution control method of a data driven information processor that does not have the execution efficiency affected by the arriving order of data packets, and that can utilize the waiting storage region effectively.

A further object of the present invention is to provide an execution control apparatus and the execution control method of a data driven information processor that does not have the execution efficiency affected by the arriving order of data packets, and that can utilize the waiting storage region effectively, and that can flexibly switch between scalar and vector data as constant data for usage.

According to an aspect of the present invention, an execution control apparatus of a data driven information processor includes an instruction system in which the handled instruction has N+2 (N is an arbitrary integer of at least 1) inputs at most, wherein one of the inputs is a constant when the instruction has N+2 inputs. The execution control apparatus includes an instruction decoder that decodes an instruction in an input packet, and outputs the number of inputs required for the instruction, and a waiting data storage device. The waiting data storage device includes a waiting data storage region that can store N waiting data in one address, and a data valid flag storage region that stores a data valid flag indicating whether the N waiting data stored in the relevant address are valid or not for each address.

The execution control apparatus further includes a constant storage device. The constant storage device includes a constant storage region and a constant valid flag storage region that stores a constant valid flag indicating whether the constant stored in each address in the constant storage region is valid or not. The execution control apparatus further includes a constant readout unit that accesses the constant storage region with the node number of the input packet as an address, and reads out a constant and a constant valid flag from the address of the constant storage region, a waiting operation determination unit that calculates an address by hash calculation from the contents in the packet, selects one of a plurality of predetermined ways of processes for waiting data, outputs a select signal, corresponding to a combination of a data valid flag corresponding to the address in the waiting storage region, a constant valid flag output from the constant readout unit and the number of instructions output from the instruction decoder, and updates the data valid flag of the relevant address according to the selected result, and a waiting region access unit that, in response to the select signal from the waiting operation determination unit performs a waiting process corresponding to that select signal.

According to another aspect of the present invention, an execution control method of a data driven information processor includes the steps of: decoding an instruction in an input data packet using an instruction decoder and providing the information of the number of inputs required by the instruction; accessing a constant storage region based on address information in the input packet, and reading out a constant and a constant valid flag from the address in the constant storage region; determining the address in the waiting storage region to be accessed by hash calculation according to the contents in the packet, and selecting one of a plurality of predetermined ways of processes for waiting data and outputting a select signal, corresponding to a combination of a data valid flag corresponding to the determined address, a constant valid flag read out from the constant readout unit, and the number of instructions output by the instruction decoder, and updating the data valid flag of the relevant address based on the selected signal, and responding to the select signal to performing a waiting process corresponding to the select signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
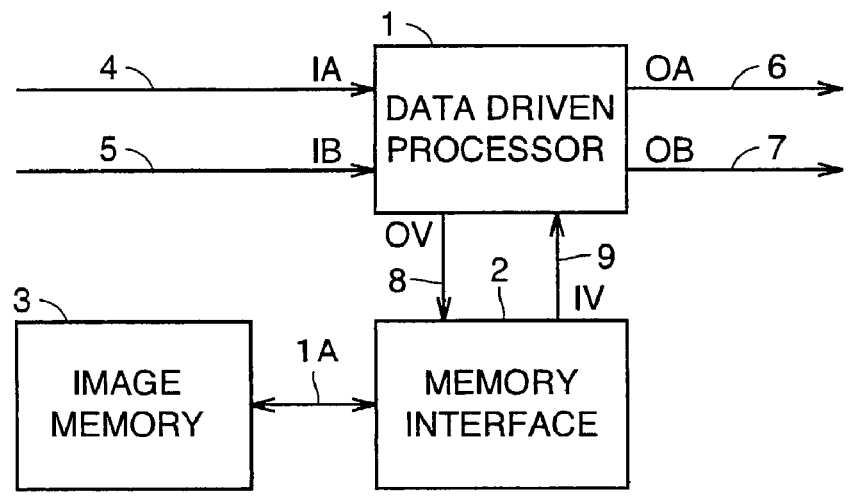
FIG. 1 shows an example of a system structure of a data driven information processor.
Figure 2:
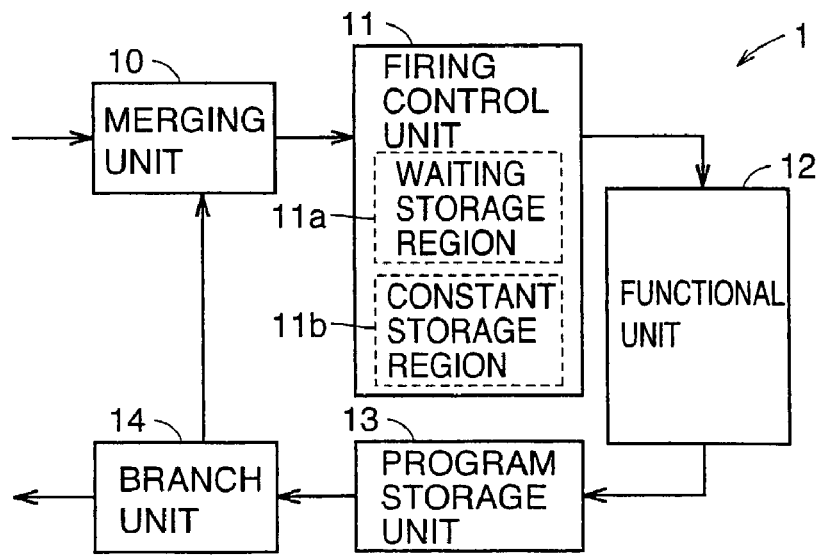
FIG. 2 is an internal basic structure diagram of a data driven information processor.
Figure 3:
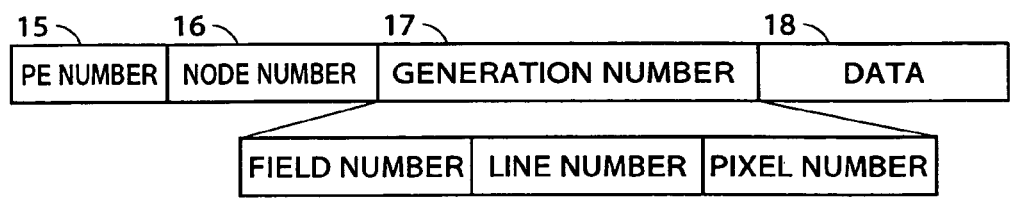
FIG. 3 shows a basic structure of an input/output packet of a conventional data driven information processor.
Figure 4:
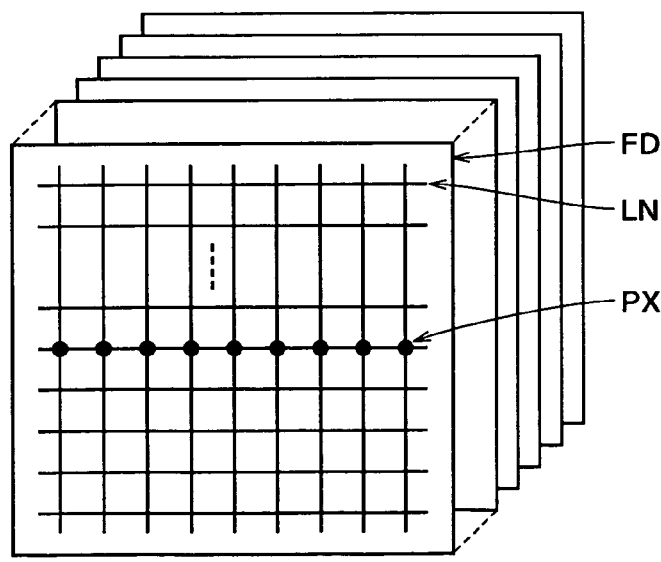
FIG. 4 shows the relationship between image data and generation number in a data driven information processor.
Figure 5:
FIG. 5 shows a basic structure of an input packet to a firing control unit of a conventional data driven information processor.
Figure 6:
FIG. 6 shows a constant storage region in a firing control unit of a conventional data driven information processor.
Figure 7:
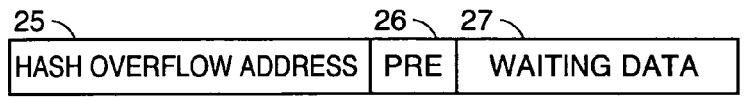
FIG. 7 shows a waiting storage region in a firing control unit of a conventional data driven information processor.
Figure 8:
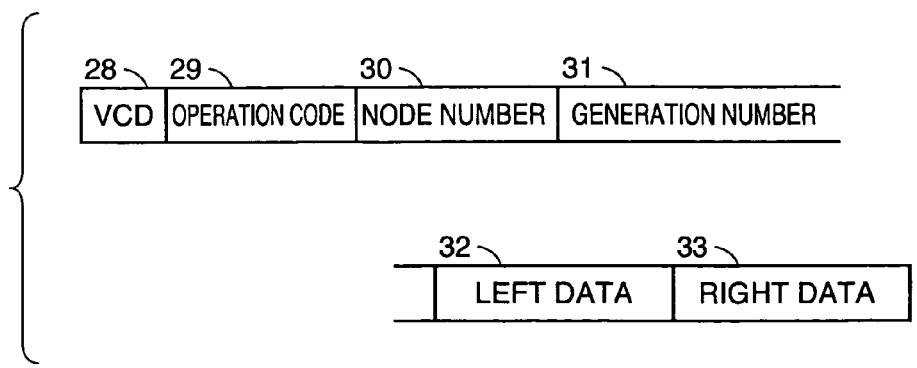
FIG. 8 shows a basic structure of an output packet from a firing control unit of a conventional data driven information processor.
Figure 9:
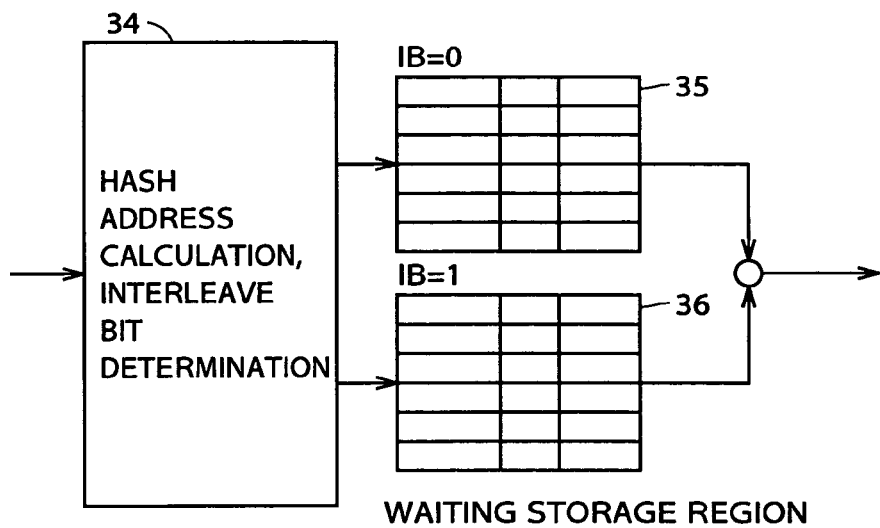
FIG. 9 shows a waiting storage unit realized by memory interleave in a conventional data driven information processor.
Figure 10:
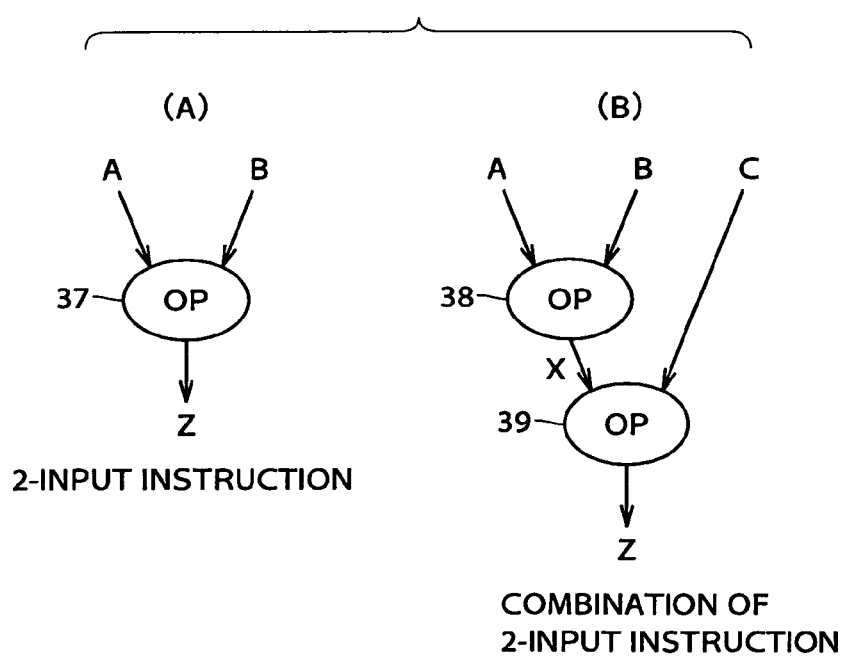
FIG. 10 shows an example of implementing a 3-input operation instruction in a conventional data driven information processor.

A description on an embodiment of an execution control apparatus of a data driven information processor will be given in the following. The apparatus can execute a 4-input instruction with a two lines of waiting packet regions and can switch between using a scalar constant and a vector constant. The structure of the entire data driven information processor of the present invention is substantially similar to that shown in FIG. 2, provided that the waiting control at firing control unit 11 differs. Therefore, components identical to those of FIG. 2 have the same reference characters and labels allotted, and detailed description thereof will not be repeated here.

Figure 11:
FIG. 11 shows the basic format of a data packet applied to a firing control unit of a data driven information processor of the present invention.

FIG. 11 shows the basic format of a data packet applied to firing control unit 11. Referring to FIG. 11, this data packet includes an operation code 40, an L/R 41 indicating whether the data packet corresponds to left input data or right input data, a node number 42, a generation number 42A, and 0th to 7th data 43 which are eight data. Since the data packet can store eight data through 0th to 7th data 43, the data packet can be used as vector data.

Figure 12:
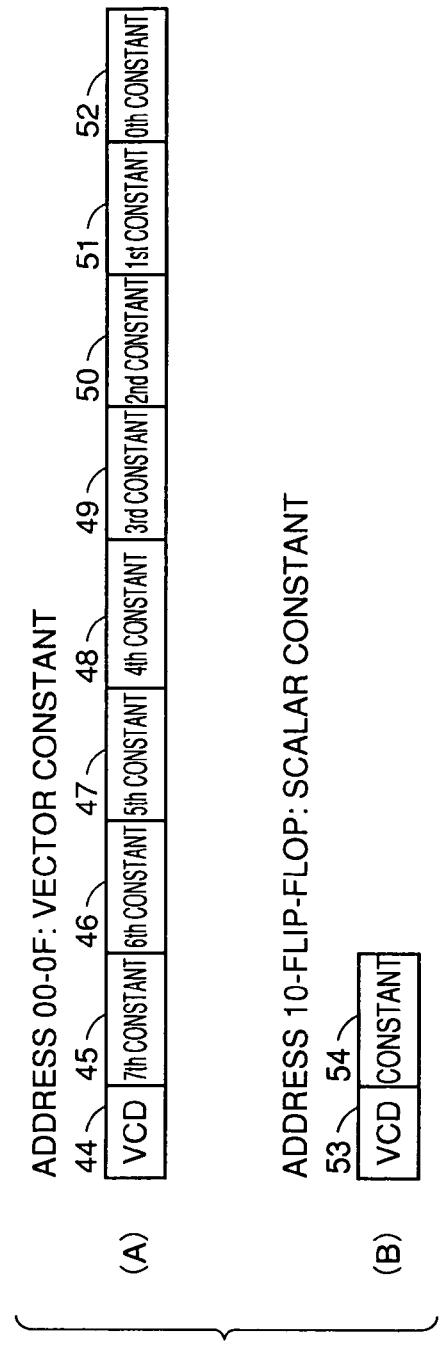
FIG. 12 shows a constant storage unit that can switch between a scalar constant and a vector constant for usage.

Referring to FIG. 12, a constant storage region 11b includes a region for storing vector constants from address 00 to address 0F (FIG. 12(A)), and a region for storing scalar constants from address 10 to address FF (FIG. 12(B)).

The vector constant as shown in FIG. 12(A) includes a VCD 44, and seventh constant 45 to 0th constant 52, for each address. VCD is a constant valid flag representing whether the constant stored in the corresponding address is valid or not in the constant storage region. Similarly, the scalar constant shown in FIG. 12(B) includes a VCD 53 and a constant 54.

When the data packet shown in FIG. 11 arrives at firing control unit 11, constant data and VCD are output from firing control unit 11 that has a structure as shown in FIG. 12. The read out constant data and VCD are embedded in the data packet. According to node number 42, i.e. the address of constant storage region 11b (00-0F or 10-FF), determination is made whether the subject to be output is a scalar constant or a vector constant. As a result, the format of a packet such as input packet 89 shown in FIG. 13 is established, and control proceeds to the process of the waiting storage unit.

Figure 14:
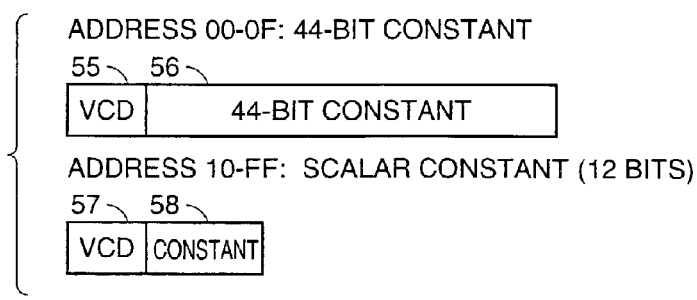
FIG. 14 shows a constant storage unit that can switch between a scalar constant and a long bit constant for usage.

Although switching between a scalar constant and a vector constant is described here, switching between a general scalar constant and a longer bit constant can be processed by a similar scheme. An example of a structure of constant storage region 11b corresponding to such a case is shown in FIG. 14. Whether the output constant is a general scalar constant or a long bit constant is determined depending upon the output address value (for example, (00-0F, or 10-FF).

Figure 13:
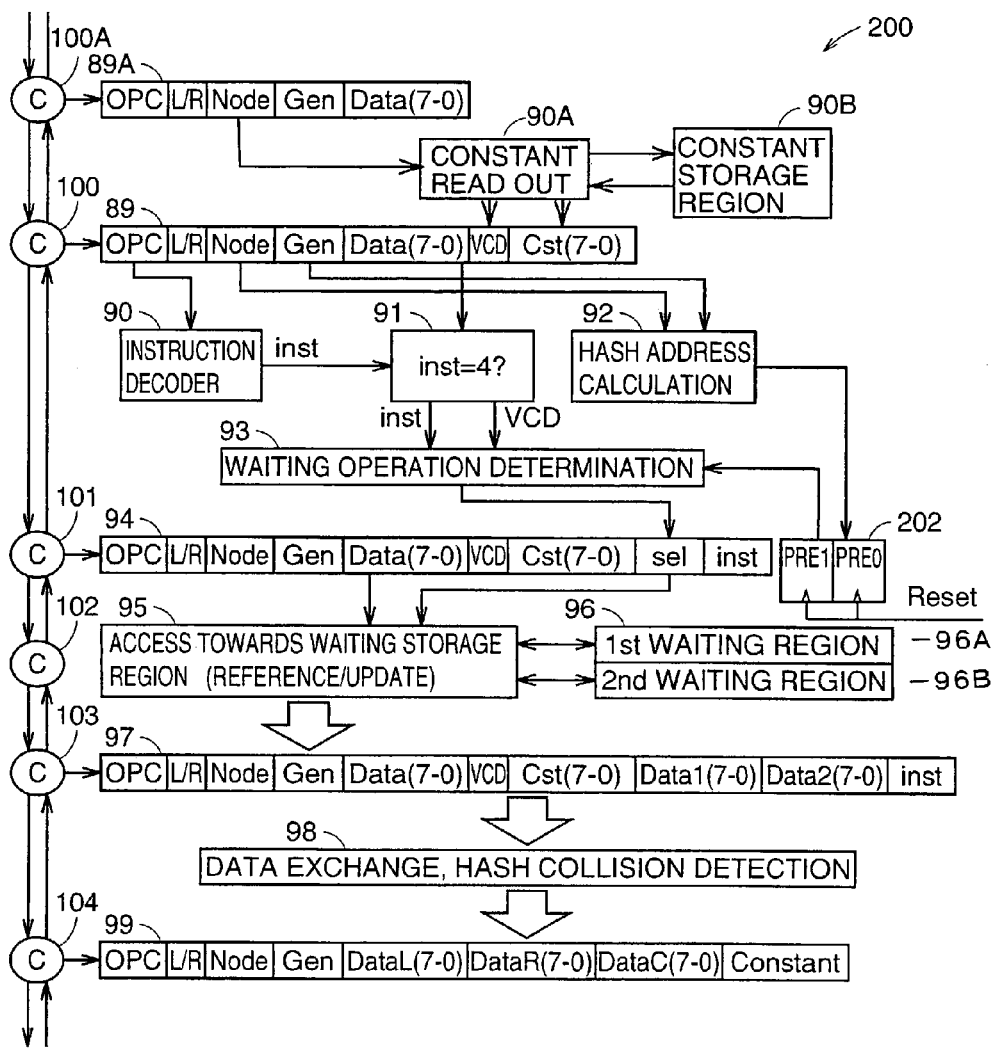
FIG. 13 shows the structure and process flow of the process in a waiting storage unit of the present invention when the process is pipelined.

The process at waiting storage unit 200 is realized by the structure shown in FIG. 13. Referring to FIG. 13, waiting storage unit 200 includes four latch circuits for holding respective packets 89, 94, 97 and 99 constituting the first to fourth stages, respectively, of the pipeline to process a data packet 89A applied from a latch circuit of the preceding stage under control of a C element 100A, and C elements 100–104 that control the data transfer between these latch circuits.

Waiting storage unit 200 further includes a constant readout unit 90A that accesses a constant storage region 90B with node number Node of packet 89A as the address, reads out a corresponding constant Cst (7-0) and the valid/invalid flag VCD of the constant, appends it to packet 89A, and assembles a packet 89; an instruction decoder 90 that decodes operation code OPC in packet 89, and outputs the number of inputs INST required by operation code OPC; a processing block 91 that determines whether input number INST is 4 or not.

Waiting storage unit 200 further includes: a waiting region 96 for storing a counterpart packet, that includes a first waiting region 96A and a second waiting region 96B forming respective partial regions; a hash calculation block 92 that calculates the hash address from the node number and generation number in input packet 89, and referring to PRE 1 and PRE 0 which are flags indicating whether first waiting region 96A/second waiting region 96B are valid or invalid, respectively by a relevant address, and determines an update value thereof according to a Table 2 that will be describe afterwards.

Waiting storage unit 200 further includes a PRE storage unit 202 formed of a PRE 1 and a PRE 0, each including a one bit D flip-flop that stores PRE 1 and PRE 0, respectively; a waiting operation determination block 93 that performs a waiting operation determination as to whether to access first waiting region 96A and second waiting region 96B or not based on number of inputs INST and VCD output from processing block 91 as well as the values of PRE 1 and PRE 0; a waiting storage unit access block 95 that accesses (read or update) either first or second waiting region 96A or 96B according to data 7-0 in packet 94 and the value of SEL; and a processing block 98 that exchanges data and detects a hash collision on packet 97 and assembles a packet 99. As will be described afterwards, PRE storage unit 202, first waiting region 96A and second waiting region 96B are included in the same waiting region 96 in the apparatus of the present embodiment.

Figure 15:
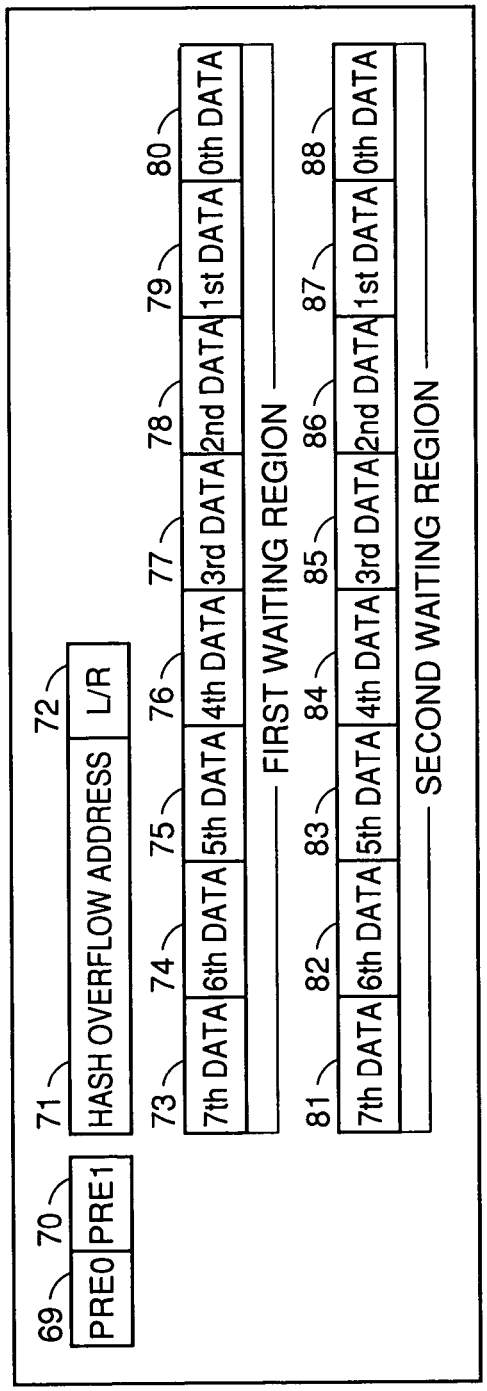
FIG. 15 shows a structure of a waiting storage unit to realize a 4-input instruction by a waiting region corresponding to two packets.

The structure of waiting region 96 is shown in FIG. 15. Referring to FIG. 15, waiting region 96 includes, for each address, a PRE 0 (69) of one bit which is the data valid/invalid flag of the first waiting region and a PRE 1 (70) of one bit which is the valid/invalid flag of the second waiting region, a hash overflow address 71, an L/R 72 which is the flag to identify whether the data in the first waiting region is left or right input, seventh data 73 to 0th data 80 corresponding to the first waiting region, and seventh data 81 to 0th data 88 corresponding to the second waiting region. Waiting region 96 has the data structure of FIG. 15 for each address. More specifically, waiting region 96 includes, for each address, a region (PRE storage unit 202) storing two waiting data, and data valid flag PRE 1/0 of each waiting data. PRE storage unit 202 includes two D flip-flop circuits to store corresponding data valid flag PRE 1/0 for each address in the apparatus of the present embodiment. These D flip-flop circuits include a reset terminal and are cleared in response to a reset signal RESET.

Referring to FIG. 13 again, input packet 89 includes an operation code OPC, L/R, a node number NODE, a generation number GEN, data (7-0), VCD, and constant data (7-0).

Packet 94 includes an operation code OPC, L/R, node number NODE, generation number GEN, data (7-0), VCD, constant (7-0), waiting operation selection SEL, and number of inputs INST.

Packet 97 includes an operation code OPC, L/R, node number NODE, generation number GEN, data (7-0), VCD, constant (7-0), data 1 (7-0) extracted from first waiting region 96A, data 2 (7-0) extracted from second waiting region 96B, and number of inputs INST.

Packet 99 includes an operation code OPC, L/R, node number NODE, generation number GEN, left data DataL (7-0), right data DataR (7-0), and control data DataC (7-0).

Waiting storage region 200 operates as set forth in the following. Operation code OPC included in input packet 89 is decoded by instruction decoder 90. Determination is made as to how many inputs the instruction has. Instruction decoder 90 outputs the determination result as the number of inputs INST. If the number of inputs INST=3, for example, operation code OPC is a 3-input instruction. In the present embodiment, number of inputs INST takes a value in the range of 1–4.

If number of inputs INST=4, operation code OPC is a 4-input instruction. It is to be noted that, in the apparatus of the present embodiment, the four inputs with respect to the 4-input instruction are defined to be constituted by three variables and one constant. Therefore, processing block 91 determines whether number of inputs INST=4 or not. If number of inputs INST=4, the value of VCD is updated to 0, and number of inputs INST is updated to 3. When number of inputs INST is updated to 3, a process similar to that when the number of inputs INST=3 is implemented from the beginning thereafter.

Hash calculation block 92 calculates the hash address from the node number and generation number of input packet 89, and refers to the values of PRE 0 and PRE 1 in corresponding PRE storage unit 202.

The correspondence of the data packet operation with respect to waiting storage unit 200, update value of PRE 0/1, and operation of waiting region 96 is shown in Table 2. In Table 2, the character "x" represents "don't care".

TABLE 2

| INST | VCD | Instruction | PRE | Packet Operations | PRE Update Values | 1st Waiting | 2nd Waiting |
|---|---|---|---|---|---|---|---|
| 1 | x | 1 input | xx | Pass | | Hold | Hold | Hold |
| 2 | 1 | 2 inputs (1 constant) | xx | Pass | Hold | Hold | Hold |

TABLE 2-continued

| INST | VCD | Instruction | PRE | Packet Operations | PRE Update Values | 1st Waiting | 2nd Waiting |
|---|---|---|---|---|---|---|---|
| | 0 | 2 inputs | x0 | 1st Waiting | 01 | Packet Write | Hold |
| | 0 | | x1 | Fire | 00 | Read | Hold |
| 3 | 1 | 3 inputs (1 constant) | x0 | 1st Waiting | 01 | Packet Write | Hold |
| | 1 | | x1 | Fire | 00 | Read | Hold |
| | 0 | 3 inputs or 4 inputs | 00 | 1st Waiting | 01 | Packet Write | Hold |
| | 0 | (1 constant) | 01 | 2nd Waiting | 11 | Hold | Packet Write |
| | 0 | | 1x | Fire | 00 | Read | Read |

In Table 2, the leftmost column "INST" represents the number of inputs INST of an instruction. The second column "VCD" represents the value of the flag indicating whether the constant read out from constant storage 90B is valid or not according to the input packet. The third column "Instruction" represents the type of the instruction. For example, "2 inputs (1 constant)" indicates that the instruction is a 2-input instruction, wherein one of the inputs is a constant.

The fourth column corresponds to PRE 1 and PRE 0 read out from PRE storage unit 202. The left side and right side of the values of two digits represent PRE 1 and PRE 0, respectively. The fifth column represents the operation applied on the packet. "Pass" indicates that the packet is to be passed through without being subjected to any operation. "First waiting" and "second waiting" indicates that the data of this packet is to be written into the first and second waiting regions, respectively. "Fire" indicates that all the data required for execution of the instruction are available, and corresponds to the process of assembling a packet including that instruction and data and sending the assembled packet to a functional unit not shown.

As to "PRE Update Value" of the sixth column, the leftmost and the rightmost digits thereof correspond to PRE 1 and PRE 0, respectively.

"Packet Write" at the seventh column and the rightmost column corresponds to the process of storing the packet in first waiting region 96A or second waiting region 96B, and updating the value of corresponding PRE 0 or PRE 1 to "1". "Read" indicates reading out waiting data from the address specified by the packet in the firing mode. "Hold" indicates that the data in the specified address is retained, and no operation is implemented.

Based on the combination of the number of inputs INST, VCD, and the values of PRE 0/1, waiting operation determination block 93 identifies the packet operation in waiting region 96 and the update value of PRE 0/1 according to Table 2, and selects any of the packet operations indicated by "Packet Operations" in Table 2, and sets the information indicating the selected operation in the field of "SEL" of packet 94. Waiting operation determination block 93 also updates the value of PRE 0/1 according to Table 2.

Then, processing block 95 accesses waiting region 96 according to the contents of the packet operation set in the field of "SEL" in packet 94.

According to the structure shown in FIG. 13, the time slot of two stages of the pipeline (C elements 101-102 and C elements 103-104) is required for the access time to the waiting storage region. In the case of a 1-input instruction or 2-input instruction (1 constant), for example, the data packet merely passes through waiting storage unit 200, and no access is required when the processing contents for both first and second waiting regions 96A and 96B are "Hold".

When the paired (or three) data packets required for operation are not available at waiting storage unit 200, the relevant packet is stored in first waiting region 96A or second waiting region 96B to wait for the appropriate data packet. This operation corresponds to "Packet Write" in Table 2.

Firing is effected when the paired (or three) data packets are available. Data are extracted from waiting region 96. Here, PRE 1/0 is updated to "00".

Last processing block 98 reassembles a packet 99 using the values of number of inputs INST, VCD, and L/R in packet 97 to be ready for the process by functional unit 12. Processing block 98 effects determination of hash collision, and sends packet 99 to functional unit 12. Thus, the process at waiting storage unit 200 ends.

In the above-described system of the present embodiment, the process of waiting storage unit 200 is divided into a plurality of pipeline stages. Therefore, the throughput at waiting storage unit 200 can be maintained constant regardless of the input order of the data packet stream. The PRE bits are stored in PRE storage unit 202, which are referred/updated in calculating the hash address and determining the waiting operation. Then, the PRE bits are stored in waiting region 96. Therefore, the PRE bits can be referred to and updated speedily in comparison to the conventional scheme of reading out from the waiting storage region and writing into the waiting storage region. By particularly implementing PRE storage unit 202 with D flip-flops, reference and update thereof can be realized at high speed with a simple circuit. In the present embodiment, this reference/update is realized in one clock cycle.

It is to be noted that PRE storage unit 202 of the present embodiment is formed of D flip-flop circuits having a reset input. The D flip-flop circuit is reset (cleared) in response to a reset signal applied through the reset input. Conventionally, an initialization packet for reset is applied to the data driven information processor in order to reset the data at the time of initialization. Since PRE storage unit 202 is formed of D flip-flop circuits in the present embodiment, the PRE bits can be reset by simply applying a reset signal to the PRE storage unit without having to use a packet for initialization.

Figure 16:
FIG. 16 shows a structure of a waiting storage unit to realize a 3-input instruction by a waiting region corresponding to one packet.

Although a 4-input instruction is implemented with two lines of waiting regions of the packet (first waiting region 96A and second waiting region 96B) in the present embodiment, a 3-line instruction can be realized with a single line of waiting region in a similar manner. In this case, the structure as shown in FIG. 16 is to be employed as the waiting region. Referring to FIG. 16, this waiting region includes a PRE 59, a hash overflow address 60, and seventh data 61-0th data 68.

Similarly, an (N+2) input instruction can be realized by providing packets of N lines (first waiting region, second waiting region, . . . , n-th waiting region) by a similar approach.

The apparatus of the present embodiment employs a D flip-flop for storing each flag. The usage of a D flip-flop allows a flag to be updated speedily with a simple structure. However, such a circuit is not limited to a D flip-flop. A flip-flop circuit of another type or a more complicated storage device may be employed to realize a similar function.

According to the method and apparatus of the present embodiment, not only a 2-input instruction, but also an instruction having three or more inputs can be processed. This increases the possibility of composite instructions. Composite instructions allow more complicated programs to be written easily. Furthermore, the instructions can be processed speedily since it is not necessary to circulate the packet during extra cycles for waiting.

According to the method and apparatus of the present embodiment, an instruction having N+2 inputs can be processed by preparing just N waiting regions. The maximum number of inputs of an instruction can be increased than in the conventional case by a constant hardware and memory capacitance. Furthermore, in the case where a program of an instruction system having the same maximum number of inputs is to be processed, equal process can be realized with hardware and memory less than those of the conventional case.

Furthermore, the method and apparatus of the present embodiment allows two types of constants to be prepared and use the same selectively. Therefore, it is possible to implement a process of more variety with the same instruction system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An execution control apparatus of a data driven information processor said execution control apparatus comprising:
  a handled instruction that includes N+2 (N is an arbitrary integer of at least 1) inputs, in which of the inputs is a constant when an instruction has N+2 inputs;
  an instruction decoder that decodes an instruction in an input packet and outputs a number of inputs required for said instruction;
  a waiting storage region including
    a waiting data storage region that can store N waiting data in each waiting data address, and
    a data valid flag storage region that stores a data valid flag for each waiting data address, said data valid flag indicating whether the N waiting data stored in said each waiting data address is respectively valid or invalid;
  a constant storage device including
    a region that stores a constant, and
    a constant valid flag storage region that stores a constant valid flag representing whether a constant stored in a plurality of constant addresses are valid or invalid;
  a constant readout unit that accesses said constant storage region according to each constant address information included in the input packet to read out a constant and a constant valid flag from a relevant constant address in said constant storage region;
  an input number detection unit that, when the number of inputs is N+2, updates the constant valid flag to a value representing "invalid", updates the number of inputs to N+1, and outputs the updated constant valid flag and the updated number of inputs to the waiting processing unit;
  a waiting operation determination unit that determines a hash address by a hash calculation from contents of the input packet, selects one predetermined way out of a plurality of predetermined ways of processing waiting data, outputs a select signal for the predetermined way of processing waiting data depending upon a combination of a data valid flag for said determined hash address, a constant valid flag read out by said constant readout unit, and the number of instruction inputs output from said instruction decoder for said waiting data storage region, and updates the data valid flag for said hash address based on the select predetermined way of processing waiting data; and a waiting region access unit being responsive to said select signal to implement a waiting process corresponding to said select signal.

2. The apparatus according to claim 1, wherein said constant storage region includes a first constant storage region that stores constant data of a first type, and a second constant storage region that stores constant data of a second type, wherein said constant readout unit identifies whether the readout constant is of said first type or said second type according to the address.

3. The apparatus according to claim 2, wherein said constant data of the first type is a scalar constant, and said constant data of the second type is a vector constant.

4. The apparatus according to claim 3, wherein each input packet can store plurality of data, and said waiting operation determination unit can store a plurality of data for each packet.

5. The apparatus according to claim 2, wherein said constant data of the first type is a scalar constant of a first length, and said constant data of the second type is a scalar constant of a second length different from said first length.

6. The apparatus according to claim 1, wherein N of said data valid flags are prepared for one address.

7. The apparatus according to claim 6, wherein each data valid flag is prepared of one bit for one waiting data of one address, and said data valid flag storage region includes N flip-flop circuits for each address, each flip-flop circuit storing a data valid flag of one bit.

8. The apparatus according to claim 1, wherein said data valid flag storage region includes an erasable storage circuit that clears the region in response to a reset signal.

9. The apparatus according to claim 8, wherein each of data valid flag is prepared of one bit for one waiting data of one address, and said erasable storage circuit includes a D flip-flop circuit for each address, each D flip-flop circuit storing a data valid flag of one bit.

10. The apparatus according to claim 1, wherein N+2.

11. The apparatus according to claim 1, wherein N+1.

12. An execution control method of a data driven information processor said data driven information processor comprising:

a handled instruction that includes N+2 (N is an arbitrary integer of at least 1) inputs, in which one of the inputs is a constant when an instruction has N+2 inputs;

an instruction decoder that decodes an instruction in an input packet to output a number of inputs required for said instruction;

a waiting storage region including a waiting data storage region that can store N waiting data in each waiting data address, and a data valid flag storage region that stores a data valid flag for each waiting data address, said data valid flag indicating whether the N waiting data stored in said each waiting data address is respectively valid or invalid;

a constant storage device including a region that stores a constant, and a constant valid flag storage region that stores a constant valid flag representing whether a constant stored in a plurality of constant addresses are valid or invalid;

a constant readout unit accessing said constant storage region with a node number of the input packet as a constant address to read out a constant and a constant valid flag from a relevant constant address in said constant storage region;

a waiting operation determination unit that determines a hash address by a hash calculation from contents of the input packet, selects one predetermined way out of a plurality of predetermined ways of processing waiting data, outputs a select signal for the predetermined way of processing waiting data corresponding to a combination of a data valid flag for said determined address, a constant valid flag read out by said constant readout unit, and the number of instruction inputs output from said instruction decoder for said waiting storage region, and updating the data valid flag for said hash address based on the selected predetermined way of processing waiting data; and a waiting region access unit being responsive to said select signal to implement a waiting process corresponding to said select signal, said method comprising:

decoding an instruction, wherein an instruction in the input packet is decoded by said instruction decoder, and the number of inputs required by the instruction is output;

reading out a constant, wherein said constant storage region is accessed based on each address information included in the input packet, and a constant and a constant valid flag are read out from a relevant constant address in said constant storage region;

updating said constant valid flag to a value representing "invalid" and said number of inputs to N+1 and applying said updated values to said waiting processing unit when said number of inputs is N+2; and determining a waiting process, wherein an hash address is determined by hash calculation from contents in the input packet, one predetermined way out of a plurality of predetermined ways of processing waiting data is selected, a select signal for the predetermined way of processing waiting data is output corresponding to a combination of a data valid flag for said determined hash address, a constant valid flag read out from said constant readout unit, and the number of instructions output from said instruction decoder for said waiting storage region, and the data valid flag is updated corresponding to said hash address based on the selected predetermined way of processing waiting data; and executing the waiting process, wherein, in response to said select signal, a waiting process corresponding to said select process is performed.

13. The method according to claim 12, wherein said constant storage region includes a first constant storage region that stores constant data of a first type, and a second constant storage region that stores constant data of a second type, wherein said reading out a constant includes:

determining as to whether the constant is of said first type or said second type based on the address, and reading out the constant.

14. The method according to claim 13, wherein
said constant data of the first type is a scalar constant, and
said constant data of the second type is a vector constant.

15. The method according to claim 13, wherein
said constant data of the first type is a scalar constant of a first length, and
said constant data of the second type is a scalar constant of a second length differing from said first length.

16. The method according to claim 12, said data valid flag storage region including an erasable storage circuit clearing the region in response to a reset signal,
said method further comprising the step of applying a reset signal to said storage circuit, thereby clearing said data valid flag storage region.

17. The method according to claim 12, wherein N+2.

18. The method according to claim 12, wherein N+1.

* * * * *